US012638424B2

(12) United States Patent
Li et al.

(10) Patent No.: US 12,638,424 B2
(45) Date of Patent: May 26, 2026

(54) METHOD FOR DETERMINING TOBACCO-SPECIFIC NITROSAMINES (TSNAs) IN CIGARETTE SMOKE USING ONE-STEP CLEAN-UP COUPLED WITH LIQUID CHROMATOGRAPHY-TANDEM MASS SPECTROMETRY (LC-MS/MS)

(71) Applicant: Yunnan Academy Of Tobacco Agricultural Sciences, Kunming (CN)

(72) Inventors: Yong Li, Kunming (CN); Tao Pang, Kunming (CN); Junli Shi, Kunming (CN); Zhongbang Song, Kunming (CN); Ge Bai, Kunming (CN); He Xie, Kunming (CN); Xingxiang Wu, Kunming (CN); Niannian Hu, Kunming (CN); Suxing Tuo, Kunming (CN); Yunhui Dai, Kunming (CN)

(73) Assignee: Yunnan Academy Of Tobacco Agricultural Sciences, Kunming (CN)

( * ) Notice: Subject to any disclaimer, the term of this patent is extended or adjusted under 35 U.S.C. 154(b) by 287 days.

(21) Appl. No.: 18/513,664

(22) Filed: Nov. 20, 2023

(65) Prior Publication Data

US 2024/0125743 A1 Apr. 18, 2024

(30) Foreign Application Priority Data

Apr. 18, 2023 (CN) .......................... 202310414694.2

(51) Int. Cl.
*G01N 30/06* (2006.01)
*G01N 30/02* (2006.01)
(Continued)

(52) U.S. Cl.
CPC ............. *G01N 30/06* (2013.01); *G01N 30/02* (2013.01); *G01N 30/04* (2013.01); *G01N 30/26* (2013.01);
(Continued)

(58) Field of Classification Search
CPC ........ G01N 30/02; G01N 30/06; G01N 30/88; G01N 30/04; G01N 30/26; G01N 30/50;
(Continued)

(56) References Cited

U.S. PATENT DOCUMENTS

2005/0032844 A1* 2/2005 Sellers ............... A61K 31/7032
514/340
2017/0027168 A1* 2/2017 Heath ..................... A61P 17/00
(Continued)

FOREIGN PATENT DOCUMENTS

CN 1299276 A * 6/2001 ............. A61P 43/00
CN 102524934 A * 7/2012
(Continued)

OTHER PUBLICATIONS

Translation_CN105954444 (Year: 2016).*

(Continued)

*Primary Examiner* — Peter J Macchiarolo
*Assistant Examiner* — Monica S Young
(74) *Attorney, Agent, or Firm* — JEEN IP LAW, LLC

(57) ABSTRACT

A method for determining tobacco-specific nitrosamines (TSNAs) in cigarette smoke using one-step clean-up coupled with LC-MS/MS is provided, including the following steps: collecting a particulate matter of mainstream cigarette smoke with a Cambridge filter pad, mixing the particulate matter of mainstream cigarette smoke, an internal standards solution and water in a 50 mL plastic centrifuge tube, and vortexing the resulting mixture at room temperature to allow extraction; transferring an extraction solution after filtration to a new centrifuge tube, adding dichloromethane, and vortexing the resulting mixture; centrifuging to collect a dichloromethane extraction solution in a lower layer to another centrifuge tube, and placing the centrifuge tube in a water bath to remove dichloromethane; dissolving
(Continued)

the resulting extraction solution in water, and transferring the resulting solution to an autosampler vial for LC-MS/MS analysis. The method has better separation and sensitivity, simple operations, and wide adaptability.

2 Claims, 3 Drawing Sheets

(51) Int. Cl.

| | |
|---|---|
| *G01N 30/04* | (2006.01) |
| *G01N 30/26* | (2006.01) |
| *G01N 30/50* | (2006.01) |
| *G01N 30/72* | (2006.01) |
| *G01N 30/86* | (2006.01) |

(52) U.S. Cl.

CPC ............. *G01N 30/50* (2013.01); *G01N 30/72* (2013.01); *G01N 30/7233* (2013.01); *G01N 30/7266* (2013.01); *G01N 30/8631* (2013.01); *Y02A 50/20* (2018.01)

(58) Field of Classification Search

CPC ............... G01N 30/72; G01N 30/7233; G01N 30/7266; G01N 30/8631; G01N 2030/042; G01N 2030/045; G01N 2030/062; Y02A 50/20

USPC ........................................................ 73/61.55

See application file for complete search history.

(56) References Cited

U.S. PATENT DOCUMENTS

| | | | |
|---|---|---|---|
| 2019/0300893 A1* | 10/2019 | Kudithipudi | A24B 15/20 |
| 2020/0239899 A1* | 7/2020 | Kudithipudi | C07K 14/415 |

FOREIGN PATENT DOCUMENTS

| | | | | | |
|---|---|---|---|---|---|
| CN | 103257194 | A | * | 8/2013 | |
| CN | 103293245 | A | * | 9/2013 | |
| CN | 105891386 | A | * | 8/2016 | ............ G01N 30/06 |
| CN | 105954444 | A | * | 9/2016 | ............ G01N 30/02 |
| CN | 106324122 | A | * | 1/2017 | ............ G01N 30/06 |
| CN | 106442753 | A | * | 2/2017 | ............ G01N 30/02 |
| CN | 106841474 | A | * | 6/2017 | ......... G01N 30/8634 |
| CN | 107064355 | A | * | 8/2017 | ............ G01N 30/06 |
| CN | 107228914 | A | * | 10/2017 | ............ G01N 30/88 |
| CN | 110779996 | A | * | 2/2020 | ......... G01N 30/8679 |
| CN | 112443015 | A | * | 3/2021 | ............ G01N 30/72 |
| WO | WO-2021215465 | A1 | * | 10/2021 | ............ A24B 13/00 |

OTHER PUBLICATIONS

Translation_CN106324122 (Year: 2020).*

Translation_CN1299276 (Year: 2001).*

GB/T 19609-2004, Cigarette—Determination of total and nicotine-free dry particulate matter using a routine analytical smoking machine, General Administration of Quality Supervision, Inspection and Quarantine of the People's Republic of China: Standardization Administration of China, 2004, pp. 1-10.

Yan-Bo Luo, et al., Simultaneous determination of polycyclic aromatic hydrocarbons and tobacco-specific N-nitrosamines in mainstream cigarette smoke using in-pipette-tip solid-phase extraction and on-line gel permeation chromatography-gas chromatography-tandem mass spectrometry, Journal of Chromatography A, 2016, pp. 16-23, vol. 1460.

Hyun-Ji Kim, et al., Determination of tobacco-specific nitrosamines in replacement liquids of electronic cigarettes by liquid chromatography-tandem mass spectrometry, Journal of Chromatography A, 2013, pp. 48-55, vol. 1291.

Yong Li, et al., Simultaneous Determination of Alkaloids and Their Related Tobacco-Specific Nitrosamines in Tobacco Leaves Using LC-MS-MS, Journal of Chromatographic Science, 2015, pp. 1730-1736, vol. 53 No. 10.

Wei Xiong, et al., Simultaneous determination of four tobacco-specific N-nitrosamines in mainstream smoke for Chinese Virginia cigarettes by liquid chromatography-tandem mass spectrometry and validation under ISO and "Canadian intense" machine smoking regimes, Analytica Chimica Acta, 2010, pp. 71-78, vol. 674.

Atsushi Ishizaki, et al., A sensitive method for the determination of tobacco-specific nitrosamines in mainstream and sidestream smokes of combustion cigarettes and heated tobacco products by online in-tube solid-phase microextraction coupled with liquid chromatography-tandem mass spectrometry, Analytica Chimica Acta, 2019, pp. 98-105, vol. 1075.

I.S. Organization, Tobacco and tobacco products-Determination of tobacco-specific nitrosamines in tobacco products—Method using LC-MS/MS, International Standard ISO 21766:2021(E), 2021, pp. 1-16, Second edition Feb. 2021.

* cited by examiner

METHOD FOR DETERMINING TOBACCO-SPECIFIC NITROSAMINES (TSNAs) IN CIGARETTE SMOKE USING ONE-STEP CLEAN-UP COUPLED WITH LIQUID CHROMATOGRAPHY-TANDEM MASS SPECTROMETRY (LC-MS/MS)

CROSS REFERENCE TO THE RELATED APPLICATIONS

This application is based upon and claims priority to Chinese Patent Application No. 202310414694.2, filed on Apr. 18, 2023, the entire contents of which are incorporated herein by reference.

TECHNICAL FIELD

The present disclosure belongs to the field of tobacco chemistry, and particularly relates to a method for determining tobacco-specific nitrosamines (TSNAs) in a particulate matter of mainstream cigarette smoke.

BACKGROUND

Tobacco and tobacco products are well-known sources of health risk. Many mutagenic and carcinogenic chemicals were found in tobacco products. Of these, tobacco-specific nitrosamines (TSNAs), the nitrosated alkaloids found in tobacco, cigarettes, cigars, and smokeless tobacco products, are among the most abundant. Of the identified TSNAs, 4-(methylnitrosamino)-1-(3-pyridyl)-1-butanone (NNK) and N'-nitrosonornicotine (NNN) have been classified as human carcinogens (IARC Group 1) by the International Agency for Research on Cancer (IARC). Nitrosoanabasine (NAB) and Nitrosoanatabine (NAT) have also been identified but not been classified as known human carcinogens (IARC Group 3).

Due to health implications, there has been a longstanding interest in analyzing TSNAs in tobacco and tobacco products. In 1974, Hoffmann et al. first reported a gas chromatography (GC) method measuring NNN in tobacco smoke and chewing tobacco. Since then, many analytical methods featuring GC, liquid chromatography (LC), gas chromatography-mass spectrometry (GC-MS), and liquid chromatography-tandem mass spectrometry (LC-MS/MS) have been published. The thermal energy analyzer (TEA) coupled with GC or LC was introduced for identifying and quantifying TSNAs. However, it is not specific to individual nitroso compounds and has relatively high detection limits. The LC-MS/MS method was then developed and provided several advantages over the GC-TEA method. It has significantly lower limits of detection, greater specificity, and a greater linear dynamic range. A publication by Wagner et al. described the determination of four TSNAs in mainstream cigarette smoke by 100 mM ammonium acetate extraction and then direct determination by LC-MS/MS. While this method was widely used and has evolved to be the international standard method and Cooperation Centre for Scientific Research Relative to Tobacco (CORESTA) recommended method, it has several noteworthy disadvantages. Specifically, this method is not suitable for determining TSNAs in flue-cured tobacco or cigarette smoke of flue-cured tobacco because of their significantly lower content of TSNAs compared to others. The signal of TSNAs usually cannot be separated and discriminated from co-eluted contaminants. Moreover, the lack of sample clean-up leads to increased ion suppression of targeted TSNAs and contamination of both the chromatography column and MS ion source. For this reason, clean-up using solid phase extraction (SPE) was suggested by the CORESTA recommended method. SPE purification involves multiple steps, such as activation of SPE columns, loading, cleaning, target elution, and preparation of various reagents. The entire process is quite lengthy and seriously affects analysis throughput and data stability. Using online SPE or online in-tube solid-phase microextraction (SPME) for purification was also reported. These methods save a lot of time compared to manual SPE and reduces various uncertainties in manual SPE operations. However, these methods with dedicated online SPE/SPME devices and related columns, reagents, and software are not easy to popularize.

SUMMARY

In order to solve the problems of the prior art such as inability to detect low-content compounds, lengthy process, low analysis throughput, data instability, high cost, inconvenient operations, and uneasy popularization, the present disclosure provides a method for determining TSNAs in a particulate matter of mainstream cigarette smoke using one-step clean-up coupled with LC-MS/MS.

Technical solutions of the present disclosure are as follows:

A method for determining TSNAs in cigarette smoke using one-step clean-up coupled with LC-MS/MS is provided, including the following steps:

collecting a particulate matter of mainstream cigarette smoke with a Cambridge filter pad, mixing the particulate matter of mainstream cigarette smoke, an internal standards solution and water in a plastic centrifuge tube, and vortexing the resulting mixture at room temperature to allow extraction; centrifuging and transferring an extraction solution to a new centrifuge tube, adding dichloromethane, and vortexing the resulting mixture; centrifuging to collect a dichloromethane extraction solution in a lower layer to another centrifuge tube, and placing the centrifuge tube in a water bath to remove dichloromethane; dissolving the resulting extraction solution in water, and transferring the resulting solution to an autosampler vial for LC-MS/MS analysis.

Preferably, the internal standards solution is prepared as follows:

adding 5.0 mg of NNN, NNK, NAT, NAB, $d_4$-NNN, $d_4$-NNK, $d_4$-NAT, and $d_4$-NAB, respectively, to 10 mL separate volumetric flasks, and adding methanol to prepare 0.5 mg/mL standard stock solutions; adding 2 mL of NNN, NNK, NAT, and NAB standard stock solutions, respectively, to one 10 mL volumetric flask, and adding water to prepare a 100 μg/mL mixed standards solution; and adding 2 mL of $d_4$-NNN, $d_4$-NNK, $d_4$-NAT, and $d_4$-NAB standard stock solutions, respectively, to one 100 mL volumetric flask, and adding water to prepare a 10 μg/mL internal standards solution.

Further preferably, the method includes; according to a national standard GB/T 19609-2004, collecting a particulate matter of mainstream cigarette smoke of 20 cigarettes with a 92-mm Cambridge filter pad, mixing the collected particulate matter of mainstream cigarette smoke, 1 mL of a 0.1 μg/mL internal standards solution and 29 μL of water in a 50 mL plastic centrifuge tube, and vortexing the resulting mixture at room temperature and a rotational speed of 2,500 rpm to allow extraction for 10 min; centrifuging and transferring 10 mL of an extraction solution to a 15-mL centrifuge tube, adding 2 mL of dichloromethane, and vortexing the resulting mixture for 1 min; centrifuging for 1 min to collect 500 μL of a dichloromethane extraction solution in a lower layer to another 1.5-mL centrifuge tube, and placing the centrifuge tube in a 40° C. water bath for about 5 min to remove dichloromethane; and dissolving the resulting extraction solution in 300 μL of water, and transferring the resulting solution to a 2 mL autosampler vial.

Further preferably, chromatographic conditions are as follows: separation is performed using a Waters HHS T3 column (2.1 mm×150 mm×1.8 μm) and equilibrated with solvent A (water) and solvent B (methanol); a flow rate of 0.25 mL min$^{-1}$ with a linear gradient is used as follows: 10% solvent B over the course of 1 min, 10-30% solvent B over the course of 1-8 min, solvent B changed to 95% over the course of 8-8.01 min, then hold for 1 min, changed to 10% over the course of 9-9.01 min, and then hold for 1 min: the column temperature is 30° C. with an injection volume of 2 μL.

Further preferably, MS conditions are as follows: electrospray ionization (ESI) source; positive ion scanning mode; spray voltage: 5,500 V; curtain gas: 35 psi; ionization source temperature: 650° C.; auxiliary gas 1: 55 psi; auxiliary gas 2: 60 psi; and declustering potential: 50 V.

The present disclosure has the following beneficial technical effects:

The present disclosure develops a simple method for analysis of TSNAs in mainstream cigarette smoke. In the method, TSNAs in a particulate matter of cigarette smoke are extracted with water, then the extraction solution is purified through one liquid-liquid extraction (LLE), and the purified sample can be directly analyzed by LC-MS/MS after a solvent exchange. Extraction with water can avoid the extraction of hydrophobic compounds (such as carotenoid pigments and lipids) from tobacco, and the purification of the extraction solution through LLE with dichloromethane can remove water-soluble impurities such as saccharides and organic acids from the water extraction solution. The method exhibits better separation and sensitivity than the direct injection after ammonium acetate solution extraction or ammonium acetate solution extraction-SPE purification. The method has simple operations, an excellent purification effect, and wide adaptability.

DETAILED DESCRIPTION OF THE EMBODIMENTS

Figure 1:
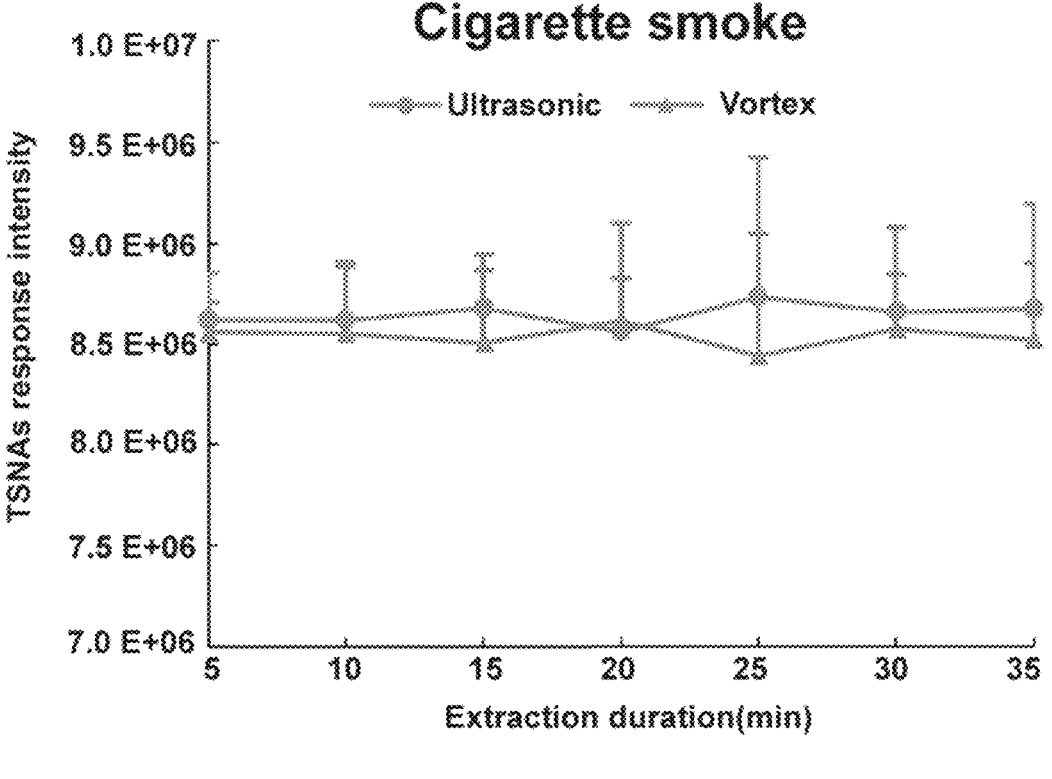
FIG. 1 shows the comparison of extraction effects of ultrasound-assisted extraction and high-speed vortex extraction at different extraction durations.

The present disclosure will be further described in detail below with reference to specific examples, but the technical solutions of the present disclosure are not limited thereto. All changes or equivalent replacements made based on the present disclosure shall fall within the protection scope of the present disclosure.

Example 1

In this example, a method for determining TSNAs in mainstream cigarette smoke using one-step clean-up coupled with LC-MS/MS was provided.

Sample Pretreatment:

According to a national standard GB/T 19609-2004, a particulate matter of mainstream cigarette smoke of 20 common cigarettes was collected with a 92 mm Cambridge filter. The collected particulate matter of mainstream cigarette smoke, 1 mL of an internal standards solution (0.1 μg/mL) and 29 mL of water were mixed in a 50 mL plastic centrifuge tube, and the resulting mixture was vortexed at room temperature (rotational speed: 2,500 rpm) to allow extraction for 10 min. 10 mL of an extraction solution after passing through an aqueous filtration membrane with 0.8 μm pore size was transferred to a new 15-mL centrifuge tube, 2 mL of dichloromethane was added, and the resulting mixture was vortexed for 1 min. Subsequently, the resulting mixture was centrifuged for 1 min, to collect 500 μL of a dichloromethane extraction solution in a lower layer to another 1.5-mL centrifuge tube, and the centrifuge tube was placed in a 40° C. water bath for about 5 min to remove dichloromethane. The resulting extraction solution was dissolved in 300 μL of water, and a resulting solution was transferred to a 2-mL autosampler vial with a conical insert.

Instrument Analysis:

Devices, Reagents, Standards, and Solutions:

Waters ACQUITY ultra performance liquid chromatography system (Waters Corporation, Milford, MA, USA); AB Sciex Triple Quad 5500 mass spectrometer (Applied Biosystems, Foster City, CA, USA); Millipore Mili-Q system (EMD Millipore, USA); RETSCH SM100 Cutting Mill (Germany); Talboys advanced multi-tube vortexer (EOFO-945066, the United States); 5804 high-speed centrifuge of German Eppendorf; analytical balance of German Sartorius, with a sensitivity of 0.0001 g; and RM20H rotary smoking machine of Borgwaldt KC (Germany).

Acetonitrile and methanol were obtained from Fisher Scientific (Fair Lawn, NJ, USA). Formic acid (chromatographically pure) and dichloromethane (chromatographically pure) were obtained from J&K Scientific. Ultrapure water of 18.2 MΩ·cm was produced by a Millipore Mili-Q system. NNK, NNN, NAB, and NAT standards and their related deuterated standards (d$_4$-NNK, d$_4$-NNN, d$_4$-NAB, and d$_4$-NAT) were purchased from Toronto Research Chemicals Inc. (North York, ON, Canada). Glass fiber filter pads (92-mm Cambridge filter pads, CFPs) were purchased from Borgwaldt KC (Hamburg, Germany).

An internal standards solution was prepared as follows: 5.0 mg of NNN, NNK, NAT, NAB, d$_4$-NNN, d$_4$-NNK, d$_4$-NAT, and d$_4$-NAB were respectively added to 10 mL separate volumetric flasks, and methanol was added to prepare 0.5 mg/mL standard stock solutions; 2 mL of NNN, NNK, NAT, and NAB standard stock solutions were respectively added to one 10 mL volumetric flask, and water was added to prepare a 100 μg/mL mixed standards solution; and 2 mL of d$_4$-NNN, d$_4$-NNK, d$_4$-NAT, and d$_4$-NAB standard stock solutions were respectively added to one 100 mL volumetric flask, and water was added to prepare a 10 μg/mL internal standards solution.

Preparation of standard solutions: Standard solutions of all target TSNAs were prepared in the concentration range of 1 ng/mL to 100 ng/mL. The concentration of internal standards at each standard curve dilution point was 10 ng/mL.

Chromatographic conditions were as follows: Separation is performed using a Waters HHS T3 column (2.1 mm×150 mm×1.8 μm) and equilibrated with solvent A (water) and solvent B (methanol); a flow rate of 0.25 mL min$^{-1}$ with a linear gradient is used as follows: 10% solvent B over the course of 1 min, 10-30% solvent B over the course of 1-8 min, solvent B changed to 95% over the course of 8-8.01 min, then hold for 1 min, changed to 10% over the course of 9-9.01 min, and then hold for 1 min; the column temperature is 30° C. with an injection volume of 2 μL.

MS conditions were as follows: ESI source; positive ion scanning mode, spray voltage; 5,500 V; curtain gas: 35 psi; ionization source temperature: 650° C.; auxiliary gas 1: 55 psi; auxiliary gas 2: 60 psi; and declustering potential: 50 V Analysis results of TSNAs and rent ions and product ions of deuterated internal standards thereof were shown in Table 1.

TABLE 1

| MS ion pairs for analysis of TSNAs | | | | |
|---|---|---|---|---|
| compound | Parent ion | Production | DP(V) | CE(V) |
| NNN | 178.0 | 148.1 | 50 | 14 |
|  | 178.0 | 120.0 | 50 | 25 |
| NNK | 208.0 | 122.0 | 50 | 16 |
|  | 208.0 | 148.1 | 50 | 17 |
| NAB | 192.0 | 162.0 | 50 | 17 |
|  | 192.0 | 133.0 | 50 | 29 |
| NAT | 190.0 | 160.0 | 50 | 13 |
|  | 190.0 | 106.0 | 50 | 23 |
| $d_4$-NNN | 182.0 | 152.1 | 50 | 14 |
|  | 182.0 | 124.0 | 50 | 25 |
| $d_4$-NNK | 212.0 | 126.0 | 50 | 16 |
|  | 212.0 | 152.1 | 50 | 17 |
| $d_4$-NAB | 196.0 | 166.0 | 50 | 17 |
|  | 196.0 | 137.0 | 50 | 29 |
| $d_4$-NAT | 194.0 | 164.0 | 50 | 13 |
|  | 194.0 | 110.0 | 50 | 23 |

Figure 2A:
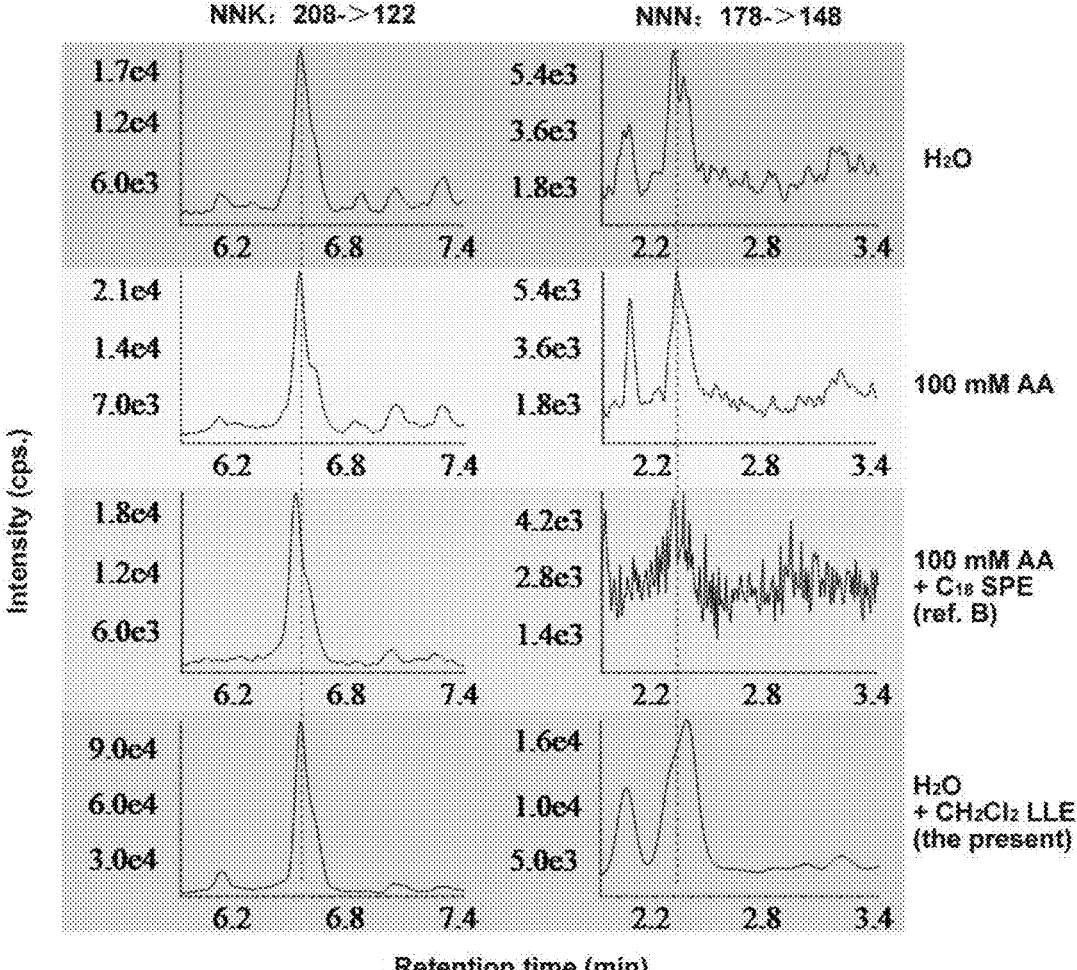
FIGS. 2A-2B shows the comparison of chromatograms of cigarette smoke sample analysis by Example 1, prior art 1, and prior art 2.
Figure 2B:
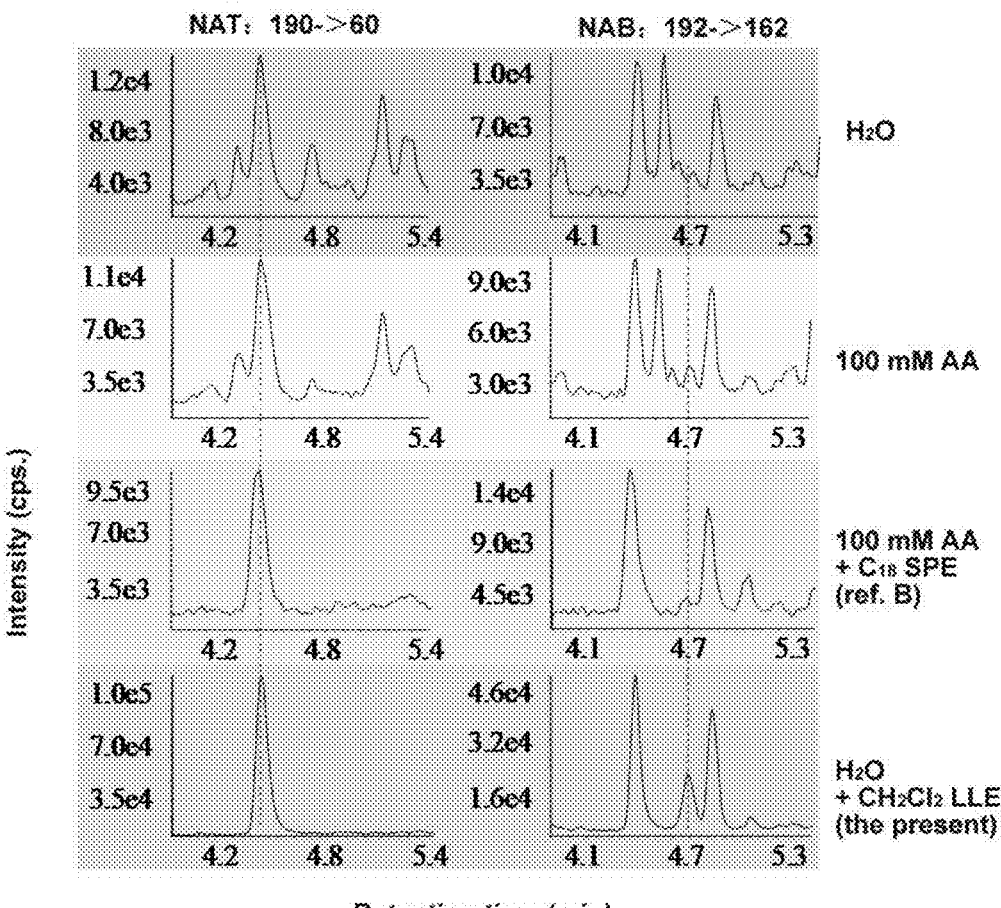

Comparison with the Existing Methods:

Extracting TSNAs from tobacco using 0.1 mol $L^{-1}$ ammonium acetate solution and directly analyzing the extract by LC-MS/MS (prior art 1) or analyzing the extract by LC-MS/MS after solid phase extraction (prior art 2) is currently the most widely used method for TSNAs analysis in tobacco. These two methods are the latest CORESTA recommended methods and ISO standard methods. Comparing the established method in this example (water extraction+dichloromethane purification+LC-MS/MS analysis) with the above methods for flue-cured tobacco sample analysis, the results show that for flue-cured tobacco leaf samples, the established method in this example has purer chromatographic peaks and higher responses of target compounds (FIGS. 2A-2B) than the above methods. Comparison results show that, for a flue-cured tobacco-type cigarette smoke sample, the analysis method established in this example leads to a purer chromatographic peak and a higher target compound response than the above method (FIGS. 2A-2B). For a flue-cured tobacco-type cigarette smoke sample, a chromatographic peak of NAB cannot be identified by the methods in prior art 1 and prior art 2; a chromatographic peak of NNN identified by the method in literature A is weak, and a chromatographic peak of NNN cannot be identified by the method in literature B. Compared with the existing methods, the established method in this example acquires significant improvement in impurity improvement and response intensity, and can allow clear identification and integration of four target compounds.

In addition, it can be seen from FIGS. 2A-2B that there is no significant difference in the chromatographic peaks obtained by water extraction and 0.1 mol $L^{-1}$ ammonium acetate extraction. The chromatographic response intensity of the four target compounds in water extract were significantly increased after purifying by LLE with dichloromethane, which is due to the fact that LLE removes a large number of matrices inhibiting MS responses of TSNAs.

Selection of Extraction Duration and Extraction Method.

Ultrasound-assisted extraction and high-speed vortex extraction were compared for TSNAs extraction in tobacco. It was found from FIG. 1 that there was no significant difference in the TSNAs content obtained by the two extraction methods. From the $5^{th}$ min, TSNAs extraction effects from different extraction durations were also compared and no significant difference was found. Vortex extraction with the extraction duration 10 min was used in this example.

Optimization of Chromatographic Conditions:

The separation effect and sensitivity of different 10 cm and 15 cm chromatographic columns were compared. C18 and T3 columns were found with better separation and sensitivity than phenyl columns, amino columns, and HILIC columns. Specifically, for tobacco samples, the T3 column with a length of 15 cm achieved good separation of the targeted TSNAs from interference matrix (FIG. 2). It is worth noting that the use of a long chromatographic column for analysis will cause the separation of cis- and trans-isomers of NNN to some degree, thereby resulting in bifurcation of an NNN peak. The addition of 0.8% formic acid to an aqueous phase can attenuate the bifurcation of an NNN chromatographic peak, but cannot completely avoid this situation.

Method Validation:

The accuracy of the method was evaluated by a spiking method. It was found that the recoveries of TSNAs in tobacco leaves were in the range of 95.7-107.7%, indicating that the established method's accuracy is acceptable. Intra-and inter-assay repeatability were used to evaluate precision. For tobacco samples, intra-assay repeatability was in the range of 3.2-4.3%, while inter-assay repeatability was in the range of 4.1-4.6%, indicating that the established method's precision is acceptable. Limit of detection (LOD) and limit of quantitation (LOQ) were estimated by adding consecutively diluted $d_4$-NNN, $d_4$-NNK, $d_4$-NAT, and da-NAB to tobacco extract for analysis by the established GC-MS analysis method. Concentrations with chromatographic signal-to-noise ratio at 3 and 10 were defined as related LOD and LOQ, respectively. LOD and LOQ of TSNAs in tobacco samples were in the range of 0.1-0.3 ng $g^{-1}$ and 0.2-0.6 ng $g^{-1}$, respectively, and LOQ of the method is lower than the corresponding TSNAs content in a flue-cured tobacco sample, indicating that TSNAs in the flue-cured tobacco sample all can be detected. Linear response of TSNAs on LC-MS/MS was also evaluated, and linear response factors ($r^2$) of NNN, NNK, NAT, and NAB were all greater than 0.99, indicating that the established method has good linear response to targeted TSNAs.

TABLE 2

| Recovery rates of TSNA analysis in a particulate matter of mainstream cigarette smoke | | | |
|---|---|---|---|
|  | Original content (ng/filter pad) | Added content (ng/filter pad) | Recovery rate (%) |
| NAT | 251.04 | 100 | 101.2 |
|  |  | 200 | 95.7 |
| NNN | 57.22 | 30 | 97.7 |
|  |  | 60 | 107.7 |

TABLE 2-continued

| Recovery rates of TSNA analysis in a particulate matter of mainstream cigarette smoke | | | |
|---|---|---|---|
| | Original content (ng/filter pad) | Added content (ng/filter pad) | Recovery rate (%) |
| NNK | 72.93 | 35 | 99.8 |
| | | 70 | 101.1 |
| NAB | 16.98 | 8 | 97.7 |
| | | 16 | 101.0 |

Note:
The standard addition recovery for cigarette smoke is conducted based on a content measured per filter pad (a particulate matter of mainstream cigarette smoke of 20 cigarettes) of a flue-cured tobacco-type cigarette sample.
Note:
intraassay precision was calculated by replicate analysis of the same sample by five times in a day. Interassay precision was calculated by replicate analysis of the same sample for five separate times per day for 3 days.

TABLE 3

| Repeatability of TSNA analysis in a particulate matter of mainstream cigarette smoke | | | | |
|---|---|---|---|---|
| | NNN | NNK | NAT | NAB |
| Intraassay (%) | 4.3 | 3.2 | 3.6 | 3.8 |
| Intraassay (%) | 5.8 | 4.1 | 5.1 | 6.1 |

Note:
intraassay precision was calculated by replicate analysis of the same sample by five times in a day. Interassay precision was calculated by replicate analysis of the same sample for five separate times per day for 3 days.

TABLE 4

| LOD and LOQ of TSNAs in tobacco | | |
|---|---|---|
| | Lower LOD (ng/cigarette) | Lower LOQ (ng/cigarette) |
| NNN | 0.3 | 0.6 |
| NNK | 0.1 | 0.2 |
| NAB | 0.1 | 0.2 |
| NAT | 0.1 | 0.2 |

Note:
LOD and LOQ were estimated by adding consecutively diluted $d_4$-NNN, $d_4$-NNK, $d_4$-NAT, and $d_4$-NAB to tobacco. Concentrations with chromatographic signal-to-noise ratio at 3 and 10 were defined as the related LOD and LOQ, respectively.

Example 2

Cherry-red tobacco is a mutant strain of flue-cured tobacco, and most of the nicotine converts to nornicotine when cherry-red tobacco is cured. As TSNAs are nitrosation products of tobacco alkaloids, changes in the alkaloids may affect the content of TSNAs in leaves of cherry-red tobacco. The method established in this disclosure was used to analyze TSNAs in cherry-red tobacco and compare to TSNAs in normal flue-cured tobacco.

It can be seen from Table 5 that the NNN content in cherry-red tobacco was significantly increased, while the contents of NNK, NAT, and NAB were decreased. In terms of total amount, the TSNAs content in cherry-red tobacco was higher than that in normal flue-cured tobacco, but the difference was not significant. The data indicates that the form of TSNAs in cherry-red tobacco has changed significantly but its total amount has not changed significantly. The experimental result shows that the established method in this disclosure can be well adapted to the analysis of flue-cured tobacco samples.

TABLE 5

| TSNAs contents of normal flue-cured tobacco and cherry-red tobacco | | | | | |
|---|---|---|---|---|---|
| | NNN (ng/ cigarette) | NNK (ng/ cigarette) | NAT (ng/ cigarette) | NAB (ng/ cigarette) | Total content (ng/ cigarette) |
| NM 1 | 1.4 ± 0.0 | 2.0 ± 0.0 | 10.2 ± 0.2 | 0.5 ± 0.0 | 14.2 ± 0.1 |
| NM 2 | 0.7 ± 0.1 | 1.4 ± 0.1 | 4.4 ± 0.1 | 0.3 ± 0.0 | 6.9 ± 0.3 |
| NM 3 | 3.7 ± 0.2 | 4.5 ± 0.4 | 15.2 ± 1 | 1.0 ± 0.1 | 24.4 ± 1.3 |
| CR 1 | 9.9 ± 0.3 | 0.6 ± 0.0 | 3.5 ± 0.1 | 0.3 ± 0.0 | 14.4 ± 0.2 |
| CR 2 | 9.7 ± 0.1 | 0.6 ± 0.0 | 3.6 ± 0.1 | 0.3 ± 0.0 | 14.2 ± 0.2 |
| CR 3 | 17.8 ± 1.1 | 1.3 ± 0.1 | 7.6 ± 0.4 | 0.5 ± 0.0 | 27.2 ± 1.5 |
| NM average | 2.9 ± 1.3 | 3.6 ± 1.4 | 12.6 ± 4.5 | 0.8 ± 0.3 | 19.9 ± 7.4 |
| CR average | 13.8 ± 44.2 | 1.0 ± 0.4 | 5.6 ± 2.1 | 0.4 ± 0.1 | 20.7 ± 6.8 |
| p (t-test) | 6.08E−12 | 4.65E−07 | 2.31E−05 | 4.65E−05 | 7.56E−01 |

Note:
NM, CR, and AV stand for normal flue-cured tobacco, cherry-red tobacco, and average, respectively.

In conclusion, in the present disclosure, based on the characteristic that TSNAs can be well released from a tobacco matrix with water and dichloromethane exhibits higher solubility for TSNAs than water, a method for analyzing TSNAs using one-step dichloromethane clean-up coupled with LC-MS/MS detection is developed. In addition, the method avoids the influence of hydrophobic interferences and water-soluble interferences on TSNAs, solves the problem of matrix interference during TSNAs analysis and tedious operations of SPE purification, and is of positive significance for improving the sensitivity, accuracy, and analysis throughput of a LC-MS/MS-based TSNAs detection method.

What is claimed is:

1. A method for determining tobacco-specific nitrosamines (TSNAs) in a cigarette smoke using a one-step clean-up coupled with liquid chromatography-tandem mass spectrometry (LC-MS/MS), comprising the following steps:

collecting a particulate matter of a mainstream cigarette smoke with a Cambridge filter, mixing the particulate matter of the mainstream cigarette smoke, an internal standards solution and water in a first centrifuge tube, and vortexing a first resulting mixture at room temperature to allow an extraction; centrifuging and transferring an extraction solution to a second centrifuge tube, adding dichloromethane, and vortexing a second resulting mixture; centrifuging to collect a dichloromethane extraction solution in a lower layer to a third centrifuge tube, and placing the third centrifuge tube in a water bath to remove dichloromethane; dissolving a resulting extraction solution in water, and transferring a resulting solution to an autosampler vial for an LC-MS/MS analysis, wherein the internal standards solution is prepared as follows:

adding 5.0 mg of N'-nitrosonornicotine (NNN), 4-(methylnitrosamino)-1-(3-pyridyl)-1-butanone (NNK), nitrosoanatabine (NAT), nitrosoanabasine (NAB), d4-NNN, d4-NNK, d4-NAT, and d4-NAB, respectively, to 10 mL separate volumetric flasks, and adding methanol to prepare 0.5 mg/mL standard stock solutions; adding 2 mL of NNN, NNK, NAT, and NAB standard stock solutions, respectively, to one 10 mL volumetric flask, and adding water to prepare a 100 μg/mL mixed standards solution; and adding 2 mL of d4-NNN, d4-NNK, d4-NAT, and d4-NAB standard stock solutions, respectively, to one 100 mL volumetric flask, and adding water to prepare a 10 μg/mL internal standards solution, and wherein the method comprises using a national standard GB/T 19609-2004 for creating the extraction solution, collecting a particulate matter of a mainstream cigarette smoke of 20 cigarettes with a 92-mm Cambridge filter pad; and dissolving the resulting extraction solution in 300 μL of water, and transferring the resulting solution to a 2-mL autosampler vial, and chromatographic conditions are as follows: separation is performed using a Waters HHS T3 column (2.1 mm×150 mm×1.8 μm) and equilibrated with a first solvent A and a second solvent; a flow rate of 0.25 mL min$^{-1}$ with a linear gradient is used as follows: 10% the second solvent over the course of 1 min, 10-30% the second solvent over the course of 1-8 min, the second solvent changed to 95% over the course of 8-8.01 min, then hold for 1 min, changed to 10% over the course of 9-9.01 min, and then hold for 1 min, wherein the first solvent is water containing 0.8% formic acid, and the second solvent is methanol; a column temperature is 30° C. with an injection volume of 2 μL.

2. A method for determining tobacco-specific nitrosamines (TSNAs) in a cigarette smoke using a one-step clean-up coupled with liquid chromatography-tandem mass spectrometry (LC-MS/MS), comprising the following steps:

collecting a particulate matter of a mainstream cigarette smoke with a Cambridge filter, mixing the particulate matter of the mainstream cigarette smoke, an internal standards solution and water in a first centrifuge tube, and vortexing a first resulting mixture at room temperature to allow an extraction; centrifuging and transferring an extraction solution to a second centrifuge tube, adding dichloromethane, and vortexing a second resulting mixture; centrifuging to collect a dichloromethane extraction solution in a lower layer to a third centrifuge tube, and placing the third centrifuge tube in a water bath to remove dichloromethane; dissolving a resulting extraction solution in water, and transferring a resulting solution to an autosampler vial for an LC-MS/MS analysis, wherein the internal standards solution is prepared as follows:

adding 5.0 mg of N'-nitrosonornicotine (NNN), 4-(methylnitrosamino)-1-(3-pyridyl)-1-butanone (NNK), nitrosoanatabine (NAT), nitrosoanabasine (NAB), d4-NNN, d4-NNK, d4-NAT, and d4-NAB, respectively, to 10 mL separate volumetric flasks, and adding methanol to prepare 0.5 mg/mL standard stock solutions; adding 2 mL of NNN, NNK, NAT, and NAB standard stock solutions, respectively, to one 10 mL volumetric flask, and adding water to prepare a 100 μg/mL mixed standards solution; and adding 2 mL of d4-NNN, d4-NNK, d4-NAT, and d4-NAB standard stock solutions, respectively, to one 100 mL volumetric flask, and adding water to prepare a 10 μg/mL internal standards solution, and wherein the method comprises using a national standard GB/T 19609-2004 for creating the extraction solution, collecting a particulate matter of a mainstream cigarette smoke of 20 cigarettes with a 92-mm Cambridge filter pad; and dissolving the resulting extraction solution in 300 μL of water, and transferring the resulting solution to a 2-mL autosampler vial, and, and MS conditions are as follows: an electrospray ionization (ESI) source; a positive ion scanning mode; a spray voltage: 5,500 V; a curtain gas: 35 psi; an ionization source temperature: 650° C.; a first auxiliary gas: 55 psi; a second auxiliary gas: 60 psi; and a declustering potential: 50 V.

* * * * *